INVENTOR:
FLOYD F. NEWSOM

ATTORNEYS

United States Patent Office 3,621,820
Patented Nov. 23, 1971

3,621,820
ROTARY INTERNAL COMBUSTION ENGINE
Floyd F. Newsom, Rte. 1, Box 78,
Marshfield, Wis. 54449
Filed Jan. 12, 1970, Ser. No. 2,186
Int. Cl. F02b 55/14
U.S. Cl. 123—8.45     2 Claims

ABSTRACT OF THE DISCLOSURE

A rotary internal combustion engine having a multiple-vaned rotor and a rotatable abutment journalled in a twin-lobed cavity. The rotor and abutment are in slideable sealing engagement with the cavity wall to form a plurality of combustion chambers peripherally about the rotor between the vanes. The combustion chambers are continually sealed from one another by the rotor vanes. A blower and fuel injector supply air and fuel, respectively, to the combustion chambers wherein the resulting mixture is compressed by further rotation of the rotor and then ignited by a sparkplug to produce a force against the leading vane of the chamber in which the ignition occurs to drive the rotor. The cavity may have more than two lobes and more than one rotatable abutment and associated mechanism in order to provide an increased number of firing points per revolution of the rotor and thereby provide power over a greater part of each revolution of the rotor.

BACKGROUND OF THE INVENTION

Field of the invention

This invention relates to rotary combustion engines of the type having a rotor and rotatable abutment journalled in a multiple-lobed cavity in the engine housing.

Description of the prior art

Various forms of rotary engines of the type having a stationary enclosing housing, a rotary piston therein, and an element generally referred to as an abutment which is itself rotatable in fixed relation to the rotary movement of the piston, are known. The abutment in this type of engine is not rotated directly by the explosive force but merely acts as a reaction face during the expansion or power stroke.

Illustrative of such engines are U.S. patents to Cimins, No. 1,933,415; Lutschg, No. 2,164,462; and Marean, No. 2,869,522, each of which discloses a carbureted rotary engine wherein the compression of the fuel/air mixture takes place in a first chamber from which it is then conveyed by a conduit or porting arrangement to a second ignition or combustion chamber.

U.S. patent to Schweiger, No. 2,198,130, discloses a carbureted rotary engine wherein during operation each combustion chamber formed at the periphery of the rotor successively opens into an adjacent chamber so that the flame continually follows the rotor vanes from one chamber into the next whereby no ignition spark is necessary after the engine is once started.

SUMMARY OF THE INVENTION

Basically, this invention comprises a simple and efficient rotary internal combustion engine having a multiple-vaned rotor and at least one rotatable abutment interacting therewith. A plurality of combustion chambers are formed about the periphery of the rotor between the vanes thereof. A blower and fuel injector supply air and fuel to the combustion chambers as each chamber passes by the air inlet and fuel injector. The combustion chambers are continually sealed from one another so that the fuel/air mixture provided in each combustion chamber is compressed and ignited therein to prodce a force against the abutment and the leading vane of the combustion chamber to drive the rotor.

Unlike known engines, for simplicity and efficiency of operation, compression and combustion both take place within the same sealed rotating combustion chamber into which the fuel and air are initially introduced. This simplified operation eliminates the considerable conduiting and porting typically found in known engines.

A plurality of relatively short-arc power strokes are provided for each revolution of the rotor for even power and efficiency.

Further, the engine has an air inlet and exhaust port positioned in overlapping relation in a radial sector with respect to the axis of rotation of the rotor so that the products of combustion are scavenged from the combustion chamber by air blown through the chamber during the time the air inlet and exhaust port are simultaneously open in the chamber.

Other objects, features and advantages of my invention will be apparent from the following detailed description taken in conjunction with the accompanying drawings wherein several preferred embodiments have been selected for exemplification of the principles of the invention.

DESCRIPTION OF THE PREFERRED EMBODIMENTS

Figure 1:
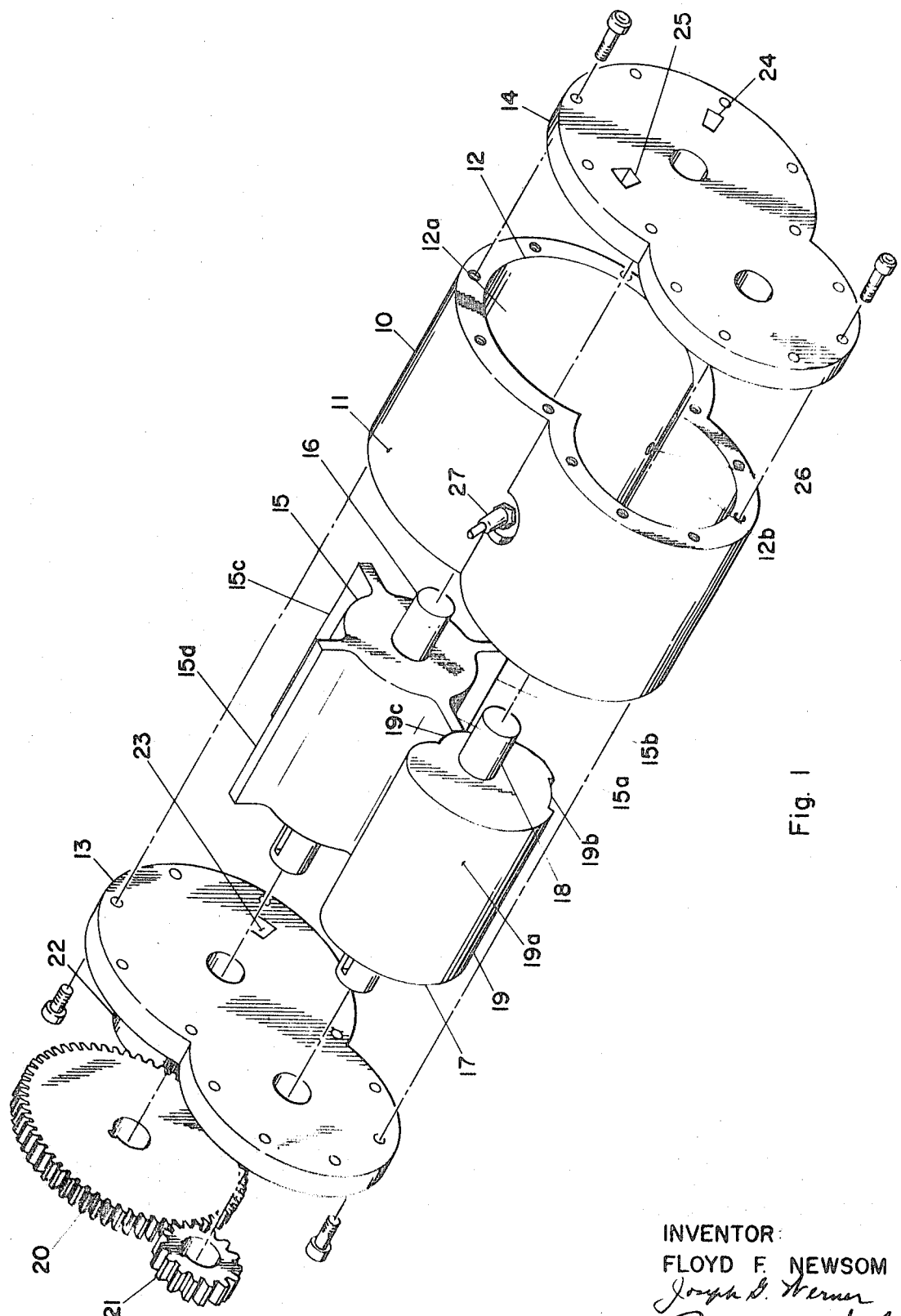
FIG. 1 is an exploded, simplified, three-dimensional view of a rotary internal combustion engine embodying my invention.

Referring now more particularly to the drawings wherein like numerals refer to like parts throughout the several views, FIG. 1 shows the basic elements of my engine comprising a housing 10 having a main wall portion 11 defining a twin-lobed cavity 12 and a pair of end plates 13 and 14 forming the ends of the cavity.

A generally cylindrically shaped rotary piston or rotor 15 having four radially extending equally spaced vanes designated 15a, 15b, 15c, and 15d is mounted in the main lobe 12a of the engine cavity 12 on a shaft 16 journalled in end plates 13 and 14.

A generally semi-cylindrical abutment 17 is rotatably mounted in the smaller lobe 12b of the engine cavity 12 on a shaft 18 journalled in end plates 13 and 14. The peripheral surface 19 of the abutment has a cylindrical portion 19a conforming to the surface of lobe 12b in which the abutment rotates, a recessed portion 19b formed in the cylindrical portion 19a, and a tri-convex portion 19c adapted to sealingly engage the ends of the rotor vanes.

The abutment is rotated by the rotor through gears 20 and 21 keyed on shafts 16 and 18, respectively. Because the rotor shown has four vanes defining four combustion chambers, ab, bc, cd and da, therebetween about the periphery of the rotor, the gears 20 and 21 must have a four-to-one gear ratio whereby the abutment 17 makes four revolutions for each revolution of the rotor 15.

The cavity defining surfaces of the main wall portion and end plates, and all the surfaces of the abutment, rotor and vanes that slideably engage one another or the surface of the engine cavity, are machined for close sealing engagement. Sealing strips and rings (not shown) of known construction for rotary engines may be employed if desired. Accordingly, the four combustion chambers thus formed about the periphery of the rotor between the vanes thereof are continually sealed from one another during operation of the engine.

Figure 3:
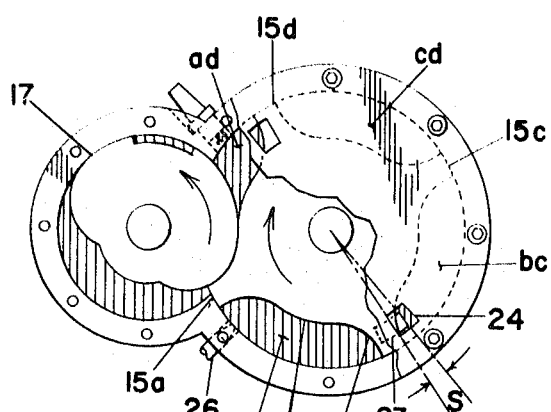
Figure 4:
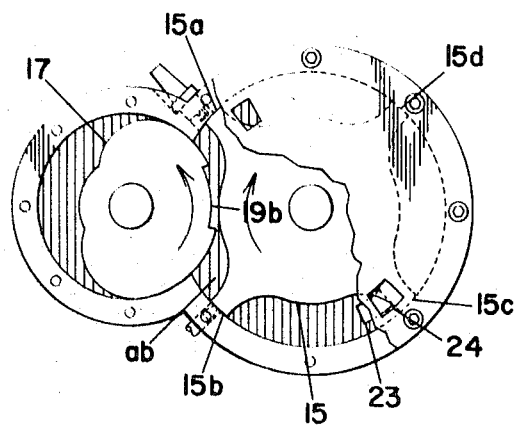

As shown in FIG. 1, an air blower 22 supplies air to the main lobe 12a of the engine cavity through an air inlet 23 in end plate 13. An exhaust port 24 is provided in end plate 14. As best shown in FIGS. 3 and 4, the air inlet 23 and exhaust port 24, while being in opposite ends of the engine housing, are positioned in overlapping relation in a radial sector (depicted at S in FIG. 3) with respect to the axis of rotation of the rotor. This provides for exhaust scavening as will be described more fully hereinafter in connection with FIGS. 3–6.

A primary exhaust port shown at 25 is provided in the engine housing for initially exhausting each combustion chamber as it moves across that exhaust port.

A fuel injector 26 is directed into the main lobe 12a of the engine cavity at substantially the location shown at FIGS. 1–6. While the fuel injector 26 is shown positioned in the main wall portion 11 of the housing for exemplification, it should be understood that it could be placed in either of the end plates, in however substantially the same radial sector with respect to the axis of rotation of the rotor shown in the drawings. Likewise, while the air inlet 23 and exhaust ports 24 and 25 are shown in the end plates 13 and 14, any or all of them could be located in the main wall portion 11 of the engine housing, however substantially the same radial sector with respect to the axis of rotation of the rotor as they are shown in the drawings.

Ignition means in the form of spark plug 27 extends through the main wall portion 11 of the housing to a point immediately adjacent the main lobe 12a of the engine cavity, for igniting the fuel/air mixture in each combustion chamber as it reaches the point of ignition.

FIGS. 2–6 diagrammatically illustrate the interaction of the rotor 15 and abutment 17 for one cycle of combustion chamber ab which is defined at the peripheral surface of the rotor between vanes 15a and 15b. As shown by the directional arrows in FIGS. 2–6, the rotor moves in a clockwise direction while the abutment rotates in a counterclockwise direction.

Figure 2:
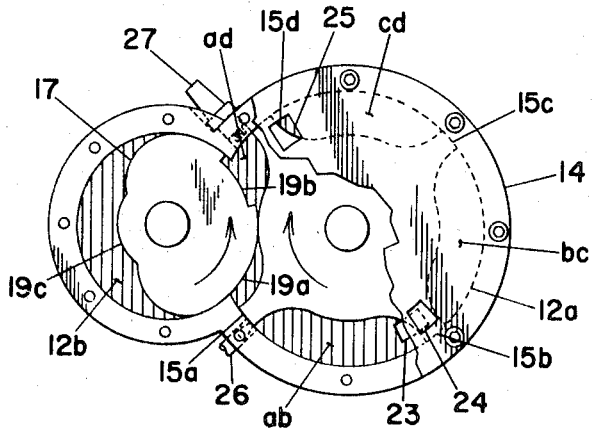
FIGS. 2–6 are diagrammatic illustrations showing the interaction of the rotor and abutment during one cycle of a single combustion chamber, and further illustrating the travel and changing shape of the combustion chamber as it moves within the engine housing.

FIGS. 2 and 3 show the two phase intake stroke for combustion chamber ab. In FIG. 2, rotor vane 15b has reached the point where it has closed the exhaust port 24 and air is being taken into combustion chamber ab through air inlet 23. The intake of air can continue until the rotation of rotor vane 15b closes the air inlet 23, as shown in FIG. 3, whereby the air is then confied in combustion chamber ab. The injection of fuel can begin when the rotor vane 15b is in the position shown in FIG. 3.

FIG. 4 shows the fuel/air mixture undergoing compression in combustion chamber ab. The recessed portion 19b in the surface 19 of the abutment 17 provides communication in combustion chamber ab as it changes shape and size during compression.

Figure 5:
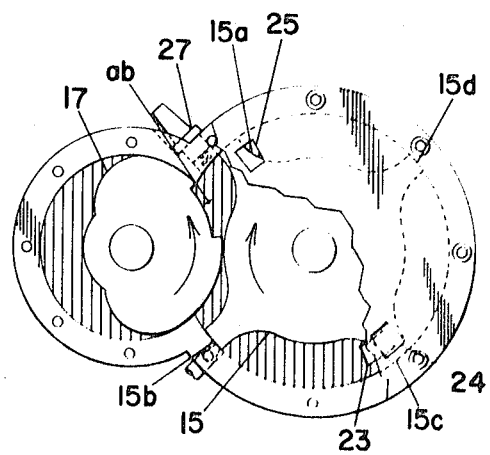

FIG. 5 shows the fuel/air mixture in combustion chamber ab at the point of ignition by spark plug 27 and the beginning of the power stroke.

Figure 6:
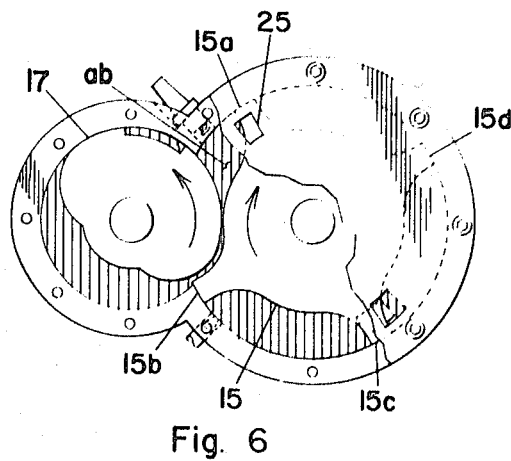

The power stroke continues until the rotor vane 15a starts to open primary exhaust port 25 as shown in FIG. 6.

Referring back to FIGS. 2 and 3, where the combustion chamber ab is in its intake and compression strokes, it will be noted that combustion chamber ad is being initially exhausted through exhaust port 25 and combustion chamber bc is undergoing scavenging due to the fact that the common radially overlapping portions of air inlet 23 and secondary exhaust port 24 are both exposed within that chamber. As the rotor vane 15c crosses over and closes exhaust port 24, combustion chamber bc enters the air intake portion of its intake stroke.

Similarly, of course, when combustion chamber ab moves around into communication with the overlapping portions of air inlet 23 and exhaust port 24, any residue exhaust products remaining therein are scavenged therefrom by air blown through the chamber whereupon the chamber the commences its intake stroke.

Figure 7:
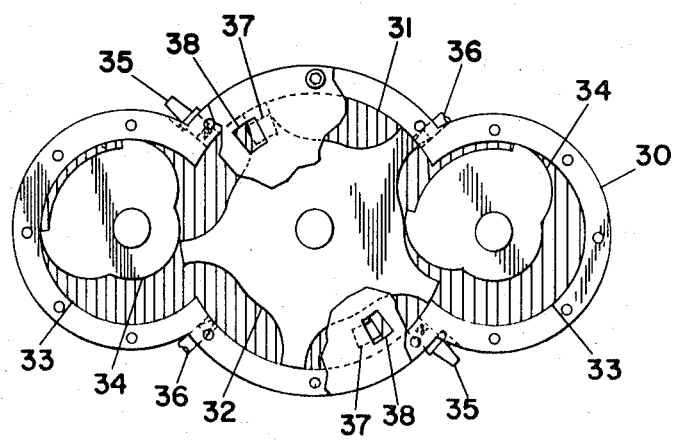
FIG. 7 is a diagrammatic illustration showing a second exemplary embodiment of my invention.

FIG. 7 shows a second embodiment 30 of my rotary internal combustion engine which is similar to the first embodiment. This embodiment has a main engine cavity 31 housing a five-vaned rotor 32 and a pair of smaller engine cavities 33 each housing rotatable abutment 34. A pair of spark plugs 35 is provided along with a pair of fuel ignitors 36. A pair of air inlets 37 and a pair of exhaust ports 38 in radially overlapping disposition with the air inlets provide an air scavenged exhaust stroke. The particular engine shown in FIG. 7 has a five-to-one abutment to rotor rotational ratio and produces ten firing points per revolution of the rotor.

Figure 8:
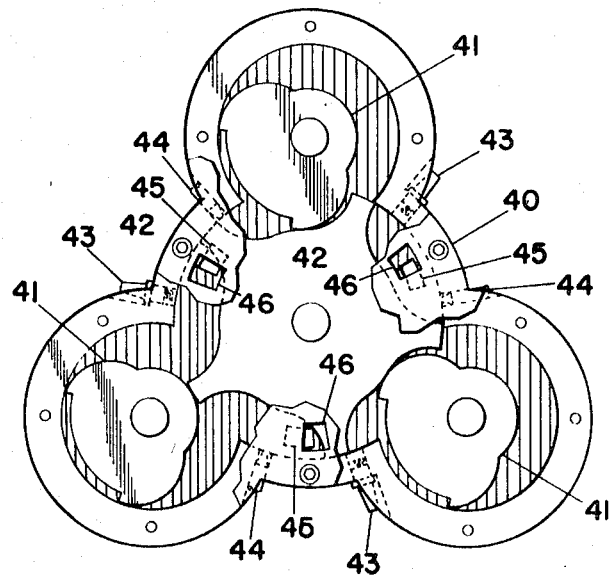
FIG. 8 is a diagrammatic illustration showing still another exemplary embodiment of my invention.

FIG. 8 shows still another embodiment 40 of a rotary internal combustion engine similar to the second embodiment, except that it has three rotatable abutments 41 interacting with a five-vaned rotor 42, and three spark plugs 43, fuel injectors 44, air inlets 45, and exhaust ports 46. In this engine arrangement, there is a five-to-one abutment to rotor rotation ratio producing fifteen firing points per revolution of the rotor.

It is understood that my invention is not confined to the particular construction and arrangement of parts herein illustrated and described for exemplification, but embraces all such modified forms thereof as come within the scope of the following claims.

I claim:
1. A rotary internal combution engine having a cycle including the four strokes of intake, compression, expansion and exhaust, said engine comprising:
    (a) a housing having a wall portion defining at least a twin-lobed cavity therein said lobes being in open communication with one another,
    (b) a rotor supported on a shaft in one of the lobes of said engine cavity,
    (c) said rotor having a plurality of substantially radially extending vanes thereon,
    (d) a rotatable abutment supported on a shaft in the second of said lobes of the engine cavity for rotatation in a direction opposite to the rotation of said rotor,
    (e) said abutment having a peripheral surface having a substantially cylindrical surface portion conforming to the surface of the wall defining the cavity lobe in which the abutment is journalled and a tri-convex portion for sealing interaction with the vanes of said rotor,
    (f) said rotor and vanes thereon and said abutment being in slideable sealing engagement with the wall defining the cavity of said housing to form a plurality of combustion chambers between said vanes, said combustion chambers being continually sealed from one another by said vanes,
    (g) means for transmitting the rotation of said rotor to said rotatable abutment,

(h) intake means for supplying fuel and air mixtures in said combustion chambers for compression therein upon rotation and interaction of said rotor and abutment, (i) means for igniting said compressed fuel and air mixtures in the combustion chambers to which they have been supplied by said intake means, and (j) means for exhausting the products of combustion formed in each of said combustion chambers.

2. The rotary internal combustion engine as specified in claim 1 having a recessed portion in said substantially cylindrical surface portion of said abutment, said recessed portion forming part of the combustion chamber at the point of ignition.

References Cited
UNITED STATES PATENTS

| | | | |
|---|---|---|---|
| 1,936,211 | 11/1933 | Richter | 123—8.07 X |
| 3,205,875 | 9/1965 | Praxmarer | 123—8.45 X |
| 3,354,871 | 11/1967 | Skrob | 123—8.07 |
| 3,358,652 | 12/1967 | Lawrence | 123—8.43 |
| 3,392,676 | 7/1968 | Bizier | 123—8.43 |
| 2,766,737 | 10/1956 | Sprinzing | 123—8.43 UX |

CLARENCE R. GORDON, Primary Examiner

U.S. Cl. X.R.

123—8.09; 418—191, 196